(12) United States Patent
Jungers (10) Patent No.: US 7,399,006 B2
(45) Date of Patent: Jul. 15, 2008

(54) METHOD AND APPARATUS FOR ASSEMBLING HVAC DUCTWORK COMPONENTS

(76) Inventor: Jon W. Jungers, 28128 144th St., NW., Zimmerman, MN (US) 55398

( * ) Notice: Subject to any disclaimer, the term of this patent is extended or adjusted under 35 U.S.C. 154(b) by 259 days.

(21) Appl. No.: 10/946,966

(22) Filed: Sep. 22, 2004

(65) Prior Publication Data
US 2006/0061104 A1  Mar. 23, 2006

(51) Int. Cl.
*F16L 25/00* (2006.01)
(52) U.S. Cl. .............. 285/420; 285/419; 24/16 PB; 24/20 TT
(58) Field of Classification Search .......... 24/16 PB, 24/20 TT, 17 A; 285/419, 420, 921
See application file for complete search history.

(56) References Cited

U.S. PATENT DOCUMENTS

| | | | |
|---|---|---|---|
| 712,765 A * | 11/1902 | Cole | 24/20 TT |
| 4,183,120 A * | 1/1980 | Thorne | 24/16 R |
| 4,214,351 A * | 7/1980 | Wenk | 24/16 PB |
| 4,453,289 A * | 6/1984 | Kleykamp et al. | 24/20 TT |
| 5,095,942 A | 3/1992 | Murphy | |
| 5,575,312 A | 11/1996 | Schroeder | |
| 5,937,488 A * | 8/1999 | Geiger | 24/16 PB |
| 6,898,825 B1 * | 5/2005 | Charest | 24/16 PB |

* cited by examiner

*Primary Examiner*—Aaron M Dunwoody
(74) *Attorney, Agent, or Firm*—Dicke, Billig & Czaja, PLLC (57) ABSTRACT

A method of assembling HVAC ductwork components is described. The method includes the step of coupling together first and second ductwork components. The method additionally includes the steps of wrapping a seal about a joint formed between the first and second ductwork components and positioning a ring clamp about the seal. In this regard, the ring clamp includes a band forming a first retention means on an exterior surface and a second retention means formed on an interior surface. The method further includes the step of repositionably retaining the ring clamp about the joint by coupling the first and second retention means together. The method ultimately includes the step of cinching the band about the joint.

9 Claims, 14 Drawing Sheets

METHOD AND APPARATUS FOR ASSEMBLING HVAC DUCTWORK COMPONENTS

BACKGROUND

The present invention relates to a ring clamp system for securing heating, ventilating, and air conditioning (HVAC) ductwork components. More particularly, it relates to a ring clamp of the system having an adjustable band defining removably interlocking projections.

Air handling systems, such as HVAC systems, include various ductwork components employed to direct heated, or cooled, and/or filtered air from a source to one or more locations, for example, a building or a room. The air handling systems can be employed in residential, commercial, and/or industrial buildings. Specifically, the air handling system can include a heating system (for example, a furnace and a blower), a cooling system (for example, an air conditioning unit), and/or a filtering system (for example, an air blower and one or more filter components). Regardless of the manner in which air is handled or treated, the ductwork components direct the treated air, in concert with an air movement system, to the location of interest. The air movement system can include one or more fans, or one or more blowers. The ductwork components can include one or more of a plenum (e.g., a hot air plenum, a cold air plenum, a straight plenum, a plenum with furnace take-off), hot air take-offs, ducts, pipes (straight or bent), boots, wall stacks, registers (e.g., wall or floor registers), tees, reducers, etc. (hereinafter collectively referred to as "ductwork components"). In this regard, ductwork components can generally be constructed of either pliant metals or rigid plastics. The pliant metal ductwork components are characterized by a level of flexibility that can be manipulated, for example by a metalworker, in joining the components together. To this end, pliant metal ductwork components are often attached with duct tape. In contrast, rigid plastic ductwork components are characterized as generally inflexible, thereby necessitating careful alignment and high-strength attachment.

More recently, a unique ductwork component design has been devised whereby the ductwork components are foam-based and integrally formed. Although not limited to the assembly and attachment of rigid plastic ductwork components, the present invention is particularly useful in coupling integrally formed, foam-based components that provide structural strength and airflow handling capability without having a separate metal layer. Such ductwork components are described in U.S. patent application Ser. No. 10/252,032, which is incorporated herein by reference.

Coupling of the integrally formed, foam-based ductwork components presents various obstacles. For example, each installation is different, thus necessitating that a variety of ductwork components be utilized. Therefore, for each installation, the ductwork components will likely be attached in varying sequences. Naturally, this complicates the installation, translating to more time spent on the job, which relates to a more costly installation. Additionally, as with any installation, an airtight seal between ductwork components is of primary importance.

Regardless of the construction of the ductwork components, the prior art has approached these challenges by employing tapes and adhesive sealants, and/or a variety of clamps requiring the use of multiple tools. In this regard, the use of the tapes and adhesives is both time-consuming and costly, and for this reason, shortcuts are sometimes taken to the detriment of the quality of the seal at the junction. The clamps employed in the prior art are often metallic and require the use of a variety of tools. For example, a common clamp is a hose clamp style of device having a threaded bolt. Screwdrivers or wrenches are typically employed to turn the bolt. Movement of the threaded bolt draws the clamp together. In this regard, the clamp is only as strong as the threads on the bolt, and for this reason, clamps in the style of hose clamps can lack sufficient clamping force to secure the rigid ductwork components of the integrally formed, foam-based construction. To this end, the failure to achieve a high quality seal between ductwork components can lead to blow-by of the air forced through the air handling system, which in turn can introduce dust, mold, or bacteria into the local residential, commercial or industrial environment.

Apart from the unique challenges inherent in coupling integrally formed, foam-based ductwork components, the prior art has struggled to achieve convenient and effective coupling between the common (galvanized and/or flexible) ductwork components. For example, U.S. Pat. No. 5,095,945 to Murphy describes a plastic self-insulating ductwork system employing a drawband secured to an annular groove formed in an adapter conduit. The drawband described in Murphy is difficult to manipulate due to its small size, and relies upon the annular groove in the adapter conduit to affect a seal. It is known in the art that such annular grooves occasionally fail to achieve a high quality seal between ductwork components. To this end, Murphy also describes adaptor conduits having slotted, spring-like teeth. In this regard, Murphy teaches the use of adhesives to seal the components together. Therefore, the prior art does not offer convenient and effective ductwork attachment mechanisms for common components, much less the more advanced integrally formed, foam-based ductwork components.

HVAC air handling systems employing ductwork components are useful and popularly employed in residential, commercial, and industrial settings. In particular, HVAC systems employing integrally formed, foam-based ductwork components offer many advantages over conventional, metallic ducts. Unfortunately, the integrally formed, foam-based ductwork components present unique assembly challenges. Therefore, a need exists for a convenient and effective method of assembling integrally formed, foam-based HVAC ductwork components.

SUMMARY

One aspect of the present invention is related to a method of assembling HVAC ductwork components. The method includes the step of coupling together first and second ductwork components. The method additionally includes the steps of wrapping a seal about a joint formed between the first and second ductwork components and positioning a ring clamp about the seal. In this regard, the ring clamp includes a band forming a first retention means on an exterior surface and a second retention means formed on an interior surface. The method further includes the step of repositionably retaining the ring clamp about the joint by coupling the first and second retention means together. The method ultimately includes the step of cinching the band about the joint.

Another aspect of the present invention is related to a ring clamp system for securing HVAC ductwork components. The ring clamp system includes a seal adapted for wrapping about a joint formed between the ductwork components, and a discontinuous band. The discontinuous band defines a receptor end, a tab end, an interior surface and an exterior surface. In particular, the discontinuous band is pre-stressed to approximate a ring shape and includes at least one projection formed on the exterior surface adjacent the receptor end and at least one projection formed on the interior surface at the tab end. In this regard, the projections are configured to removably interlock to retain the band around the HVAC ductwork components.

Yet another aspect of the present invention is related to an air handling system. The air handling system includes a first ductwork component, a second ductwork component, and a ring clamp. The first and second ductwork components are coupled together to define a joint. The ring clamp is secured about the joint. In this regard, the ring clamp includes a band defining a receptor end, a tab end, an interior surface, and an exterior surface; at least one projection formed on the exterior surface adjacent the receptor end; and at least one projection formed on the interior surface at the tab end. To this end, the projections interlock to maintain a position of the ring clamp about the joint.

Yet another aspect of the present invention is related to a kit for securing a first ductwork component to a second adjacent ductwork component. The kit includes at least one ring clamp, a clamping device, and a seal. The ring clamp(s) include a discontinuous band defining a receptor end and a tab end, a first boss formed adjacent to the receptor end, and a second boss formed at the tab end. Specifically, the first and second bosses are formed on an exterior surface of the band. The clamping device is coupleable between the first and second bosses. A length of the seal is greater than a circumference of the first and second ductwork components.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

Figure 1:
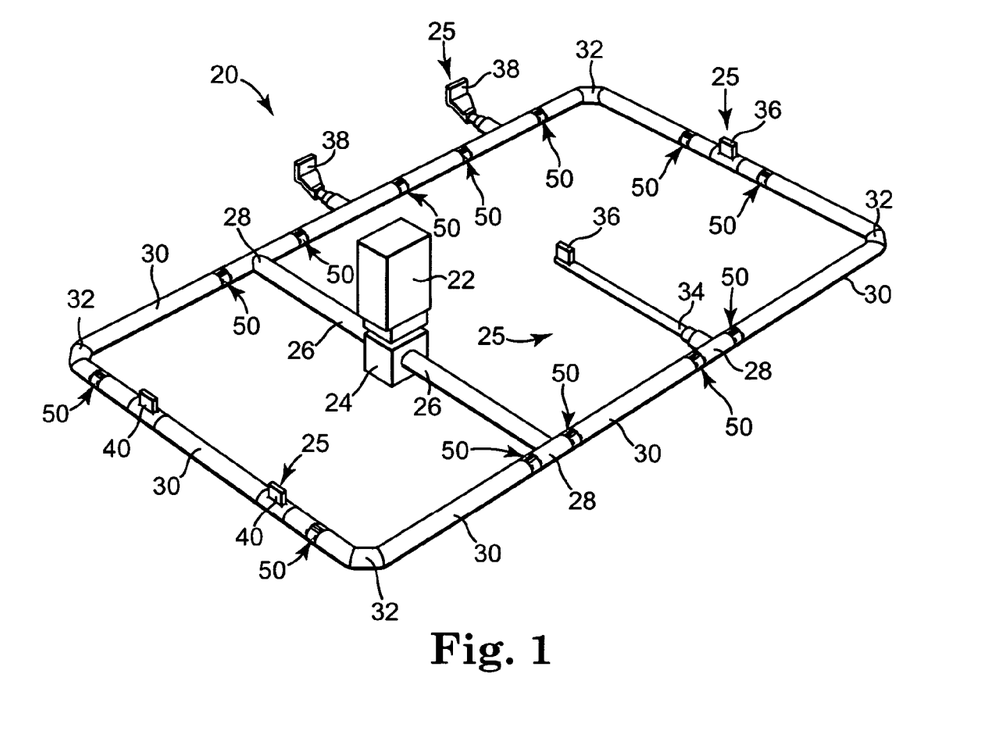
FIG. 1 is an air handling system illustrating HVAC ductwork components and ring clamp systems according to one embodiment of the present invention.

One aspect of the present invention relates to a ring clamp system useful for connecting ductwork components of an air handling system. With this in mind, an exemplary air handling system 20 including ductwork components (referenced generally at 25) is shown in FIG. 1. In this regard, the air handling system 20 reflects but one of a multitude of possible configurations with which the present invention is useful. That is to say, air handling systems, such as the system 20, are designed to satisfy the criteria of the particular residential, commercial, or industrial installation. Thus, depending upon the particular installation criteria, additional ductwork components 25 maybe included and/or others of the ductwork components 25 eliminated. In light of this, the ductwork components 25 of the present invention can be heating, ventilating, and air conditioning (HVAC) components positioned in a variety of orientations, and as such, directional terminology is stated for purposes of illustration only and is in no way limiting. It is to be understood that other embodiments may be utilized employing various ductwork components 25 without departing from the scope of the present invention. The following detailed description, therefore, is not to be taken in a limiting sense, and the scope of the present invention is defined by the appended claims. With this in mind, the exemplary air handling system 20 includes a furnace 22 including a blower (not shown); HVAC ductwork components 25 including a plenum 24, takeoffs 26, tees 28, straight pipes 30, elbows 32, a reducer 34, tee boots 36, offset footer boots 38, and saddle boots 40; and ring clamp systems 50. As described in greater detail below, the ductwork components 25 are coupled to one another by various ones of the ring claim systems 50.

The HVAC ductwork components 25 encompass a wide variety of shapes selected to achieve a variety of functions. In general terms, the ductwork components 25 are rigid components as described in U.S. patent application Ser. No. 10/252,032, incorporated into this disclosure in its entirety by reference. Preferably, the ductwork components 25 comprise integrally formed, foam-based bodies that provide requisite structural strength and airflow handling capabilities without the having a separate metal layer, although other constructions are equally acceptable.

Figure 2:
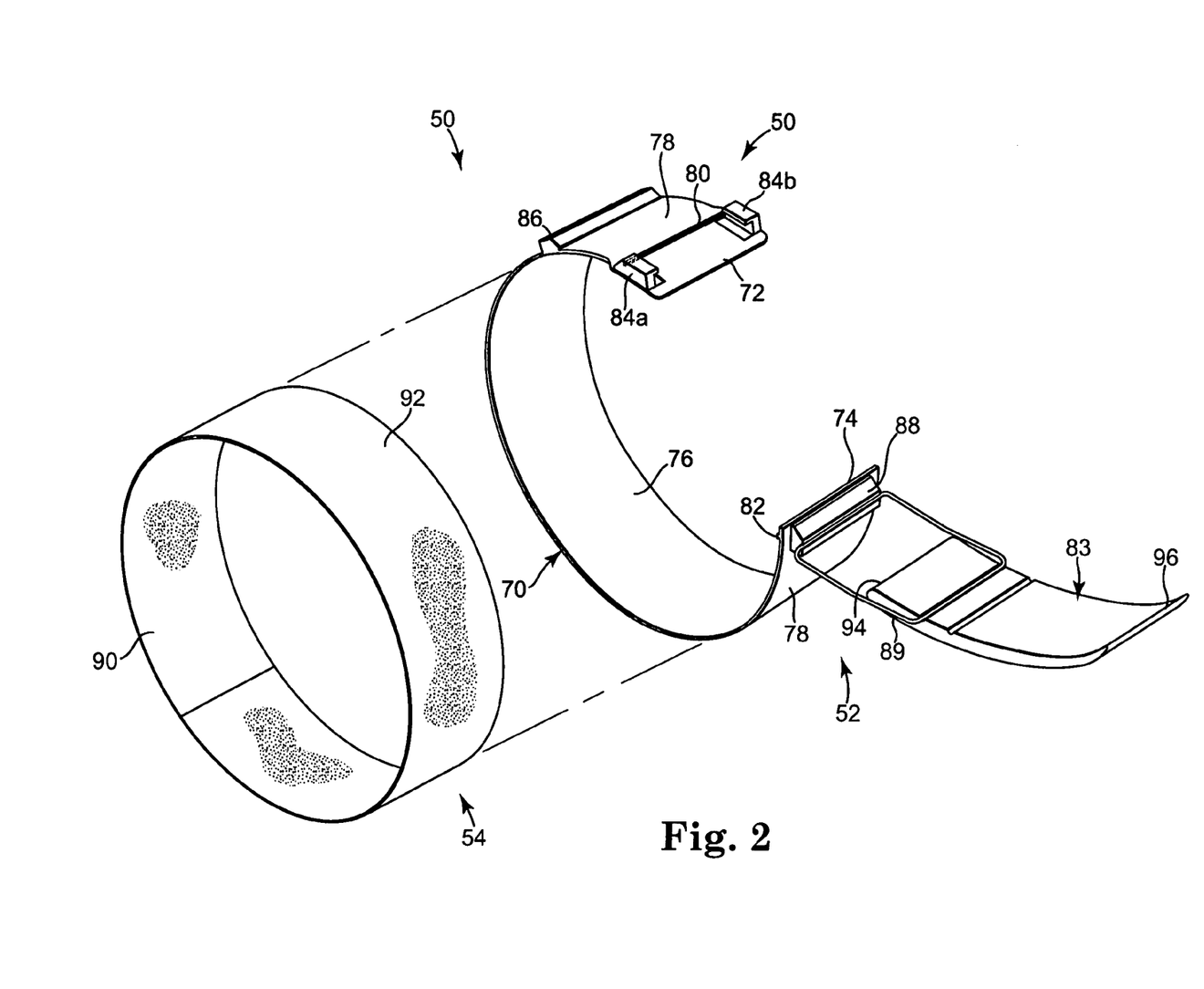
FIG. 2 is a ring clamp system including a ring clamp and a seal according to one embodiment of the present invention.

FIG. 2 is a perspective view of the ring clamp system 50 according to one embodiment of the present invention. The ring clamp system 50 includes a ring clamp 52 and a seal 54.

The ring clamp 52 is employed to interconnect various adjacent ductwork components 25. With this in mind, the ring clamp 52 includes a band 70 defining a receptor end 72, a tab end 74, an interior surface 76, an exterior surface 78, a first retainer 80, a second retainer 82, and a clasp 83.

The band 70 is discontinuous such that the receptor end 72 is separate from the tab end 74. In this regard, the band 70 is pre-stressed to approximate a ring shape such that the receptor end 72 is opposite from, and configured to receive and removably interlock with, the tab end 74 via the retainers 80, 82.

The first retainer 80 is formed on the exterior surface 78 adjacent to the receptor end 72, and the second retainer 82 is formed on a portion of the interior surface 76 at the tab end 74. The retainers 80, 82 are configured to couple together to repositionably engage the receptor end 72 with the tab end 74. In this regard, in one embodiment the first retainer 80 is a projection projecting out from the exterior surface 78, and the second retainer 82 is a projection projecting in from the interior surface 76. In addition, opposing guides 84a and 84b are formed on the exterior surface 78 adjacent to the receptor end 72 and are configured to slidingly receive the tab end 74. Specifically, the tab end 74 can be aligned over the receptor end 72 and maintained between the guides 84a, 84b such that the retainers 80, 82 removably interlock the band 70 in the ring shape. The band 70, as described above, is repositionably retained in the ring shape when the projecting retainers 80, 82 are interlocked, such that the band 70 can encircle and be adjusted about the ductwork components 25. When the band 70 is in a desired position, the ring clamp 52 can be tightly cinched, as described below.

A first boss 86 is formed adjacent to the first retainer 80, and a second boss 88 is formed at the tab end 74, the bosses 86, 88 adapted for tightly cinching the ends 72, 74 of the band 70 together. In one embodiment, the clasp 83 is movably secured to the second boss 88 via a formed wire 89. The wire 89 permits the clasp 83 to span over to the first boss 86. To this end, the bosses 86, 88 are formed on the exterior surface 78, and the first boss 86 provides a grasping area for the clasp 83 to engage with in cinching the ring-shaped band 70 tightly about the HVAC ductwork components 25, as best described with reference to FIGS. 3A-3B below.

Figure 3A:
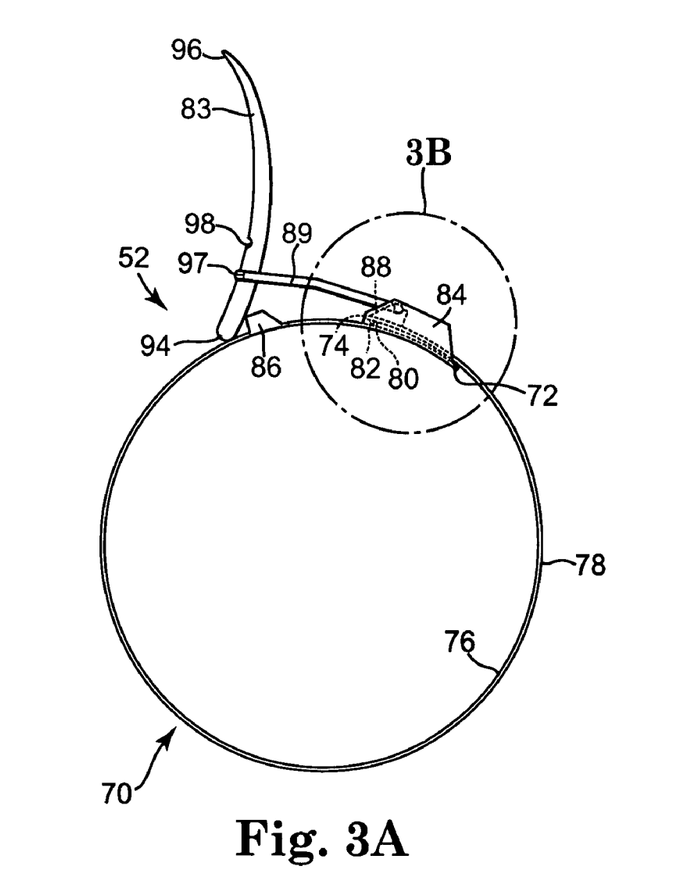
FIG. 3A is a side view of the ring clamp shown in FIG. 2 illustrating removably interlocked projections and an open and unlocked clasp according to an embodiment of the present invention.

FIG. 3A is a side view of the ring clamp 52 showing the projecting retainers 80, 82 removably interlocked and the clasp 83 in an unlocked and open position. In this orientation, the ring clamp 52 is depicted as if coupled around the ductwork components 25 and the seal 54, which are not shown for ease of illustration. The clasp 83 and the wire 89 extended over the first boss 86. An engagement end 94 of the clasp 83 contacts the first boss 86 and a lever end 96 of the clasp 83 is available for applying a load by grasping, for example by grasping with a hand. In addition, the clasp 83 also defines a first slot 97 and a second slot 98. The formed wire 89 is engaged in one of the slots 97, 98. To this end, a selective engagement of the wire 89 in one of the slots 97, 98 adjusts a level of compression delivered to the ring clamp 52 by the clasp 83. As illustrated, the wire 89 is coupled to the first slot 97 such that an intermediate level of compression is delivered to the band 70 by the clasp 83 when closed. Alternately, the wire 89 could be engaged with the slot 98 to achieve a higher level of compression in the closed ring clamp 52. In one embodiment, the wire is frictionally engaged with the slots 97, 98. With this in mind, the first boss 86 functions as a fulcrum and the clasp 83/wire 89 function as a lever in tightly cinching the ends 72, 74 of the band 70 together.

Figure 3B:
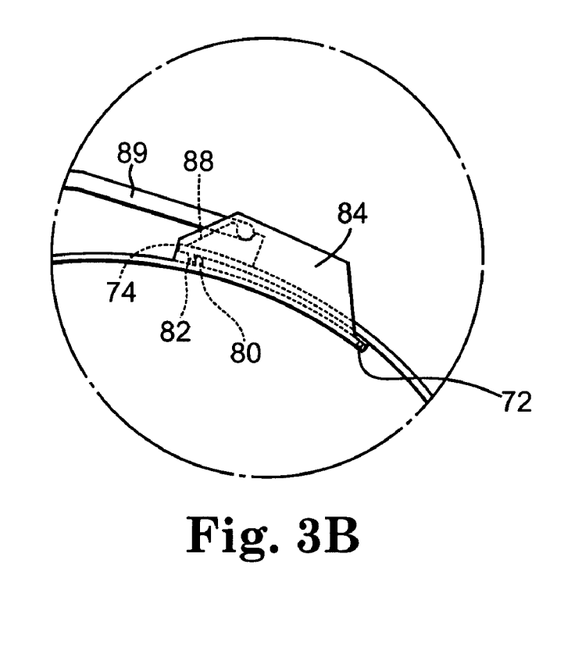
FIG. 3B is an enlarged side view of the removably interlocked projections shown in FIG. 3A.

FIG. 3B is an enlarged side view of the removably interlocked projecting retainers 80, 82. The tab end 74 has been passed through the guides 84a, 84b (guide 84a visible in the side view) and the second retainer 82 has been lifted over, and coupled to, the first retainer 80. The retainers 80, 82 are configured to couple together to repositionably retain the ends 72, 74 of the ring clamp 52. In this manner, the ring clamp 52 is semi-assembled and adapted for accurate positioning just prior to being securely fastened via movement of the clasp 83.

Figure 3C:
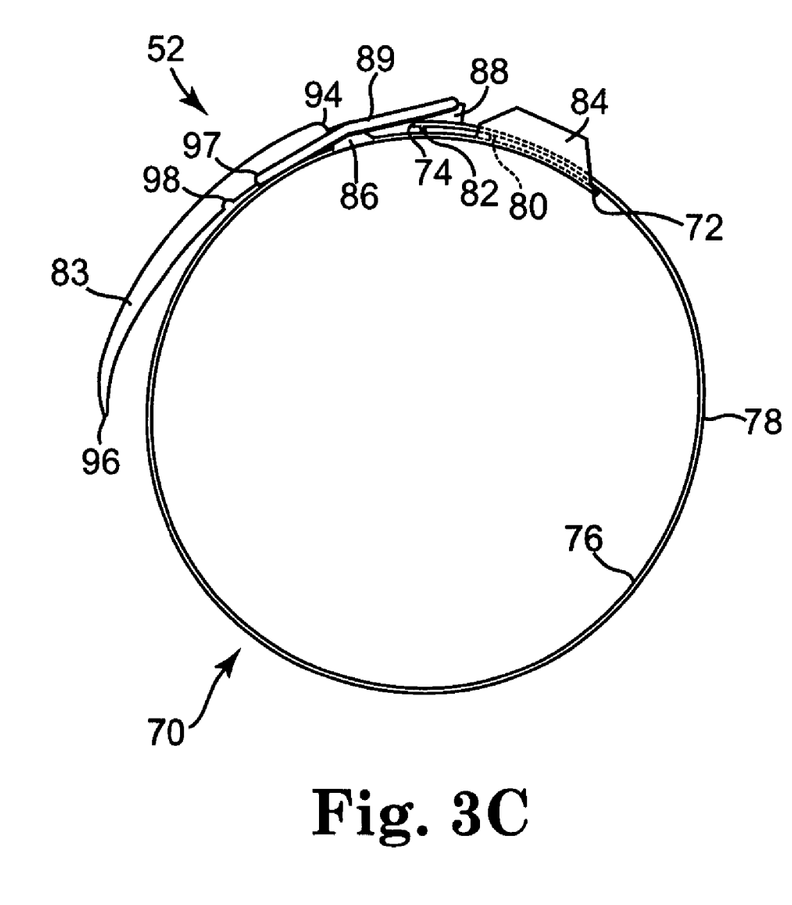
FIG. 3C is a side view illustrating a closed and locked clasp according to an embodiment of the present invention.

FIG. 3C is a side view of the ring clamp 52 showing the clasp 83 in a down and locked position. The lever end 96 of the clasp 83 has been moved down to conform to the exterior 78 of the band 70. In doing so, the engagement end 94 has been brought to bear against the first boss 86, thus cinching the band 70 tightly together by moving the first boss 86 toward the second boss 88. In particular, the formed wire 89 is coupled between the second boss 88 and the first slot 97 of the clasp 83, such that a force applied by the clasp 83 is transferred through the second boss 88 to draw the second boss 88 toward the first boss 86. In this manner, an inside diameter of the band 70 is reduced by the downward lever motion of the clasp 83, and the band 70 is locked in the cinched state (i.e., the band 70 is tightened).

The band 70 is generally durable and flexible. In one embodiment, the band 70 is formed of integrally formed, foam-based plastic. In an exemplary embodiment, the band 70 has a width of approximately 5 inches and a length (i.e., a circumference) selected such that the band 70 can couple about ductwork component 25 having an outside diameter of approximately 10 inches. In this regard, the band 70 is compatible with ten-inch ductwork components 25 having a circumference that is increased by the presence of the seal 54. To this end, the band 70 is formed to a desired length and the bosses 86, 88 are positioned apart from the ends 72, 74 to facilitate an unimpeded cinching of the band 70. In an alternate embodiment, the band 70 defines a length such that its circumference is suited for coupling about a ductwork component 25 having an outside diameter of approximately 6 inches. In another exemplary embodiment, the band 70 includes a pigment such that the ring clamp 52 has a visually contrasting color distinct from the ductwork components 25.

The seal 54 defines a duct surface 90 and a clamp surface 92. In one embodiment, the duct surface 90 includes an adhesive layer (not shown) that is covered by a liner (not shown) prior to attachment to the ductwork components 25. In a preferred embodiment, the seal 54 is flexible, formed of, for example, open cell foam and the clamp surface 92 is pliant. In this manner, the interior surface 76 of the ring clamp 52 compresses the seal 54 and tightly couples the two ductwork components 25 together.

Figure 4A:
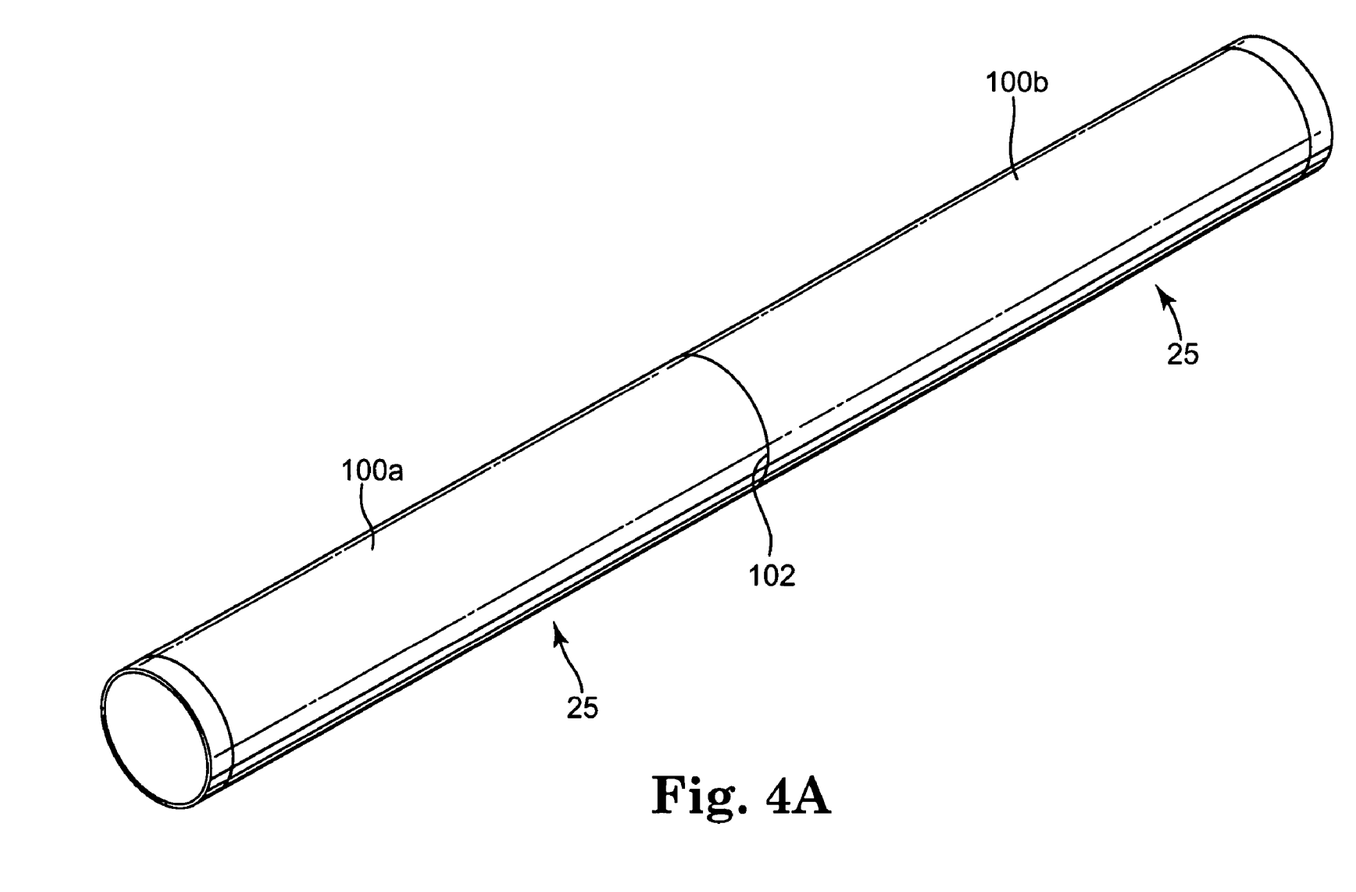
FIG. 4A is perspective view of two HVAC ductwork components coupled to form a joint.

The installation of an air handling system, for example air handling system 20 (FIG. 1), is designed to satisfy the criteria of a particular residential, commercial, or industrial installation. During the installation of the air handling system 20, various ones of the ductwork components 25 are joined together. To this end, FIG. 4A illustrates a first straight pipe 100a positioned adjacent to a second straight pipe 100b forming a joint 102 there between. In this regard, the straight pipes 100a, 100b are butted together and the joint 102 is free to move (i.e., unsecured).

Figure 4B:
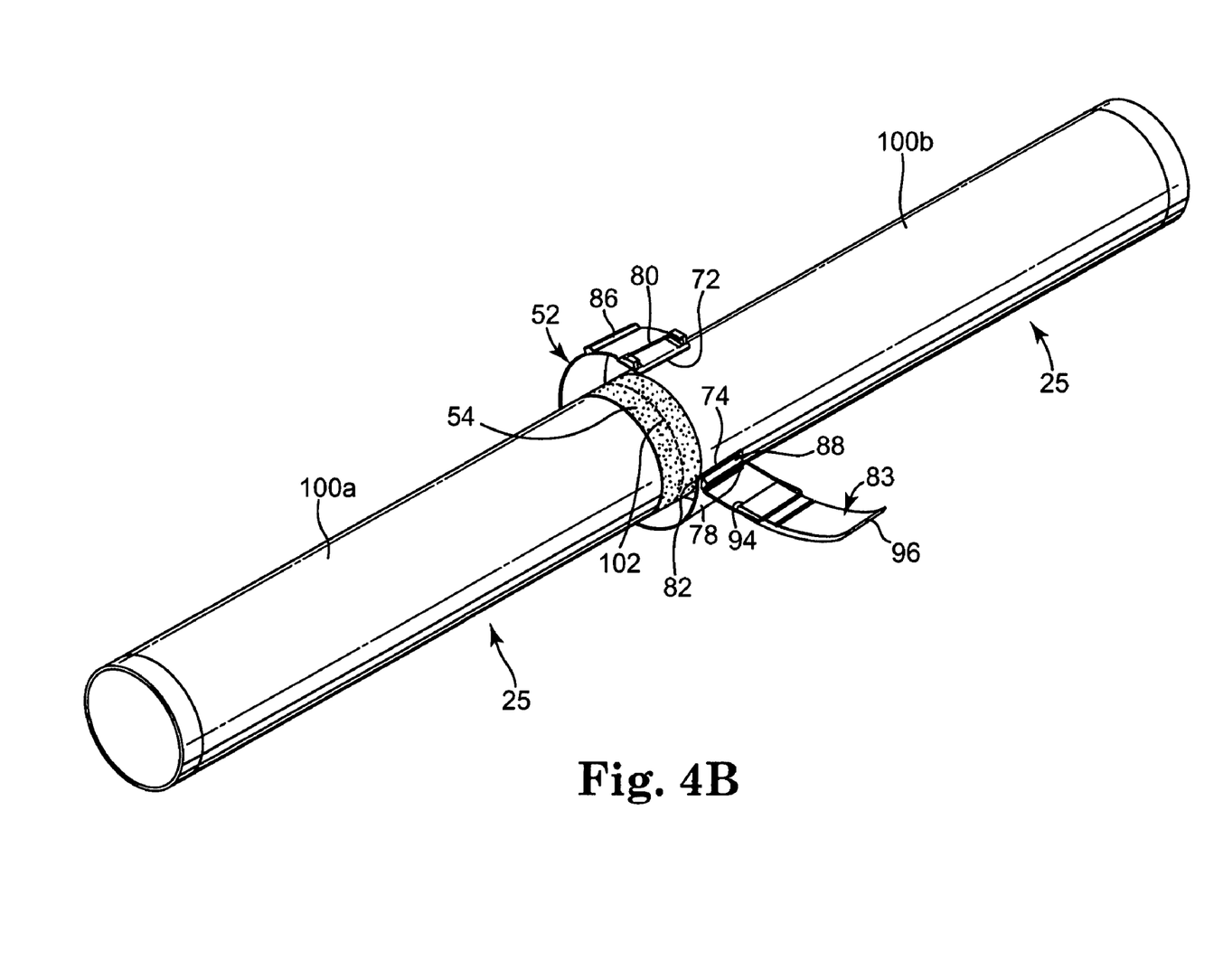
FIG. 4B is a perspective view of the ring clamp system shown in FIG. 2 disposed about the joint shown in FIG. 4A.

The ductwork components 25 can be assembled and secured through the use of the ring clamp system 50 (FIG. 2). To this end, FIG. 4B illustrates the seal 54 disposed about the joint 102 and the ring clamp 52 positioned about the seal 54. In this manner, the seal 54 covers the joint 102 and the straight pipes 100a, 100b are positioned to be secured by tightening of the ring clamp 52.

In particular, the tab end 74 and the receptor end 72 are splayed apart such that the band 70 encircles the joint 102. In this manner, tab end 74 is positioned for entrance into the receptor end 72 to permit the projecting second retainer 82 to couple with the projecting first retainer 80 in repositionably retaining the ring clamp 52 about the joint 102. The clasp 83 is shown elevated above the second boss 88 such that the band 70 can be maneuvered relative to the seal 54 to achieve a desired, accurate positioning over the joint 102.

Figure 4C:
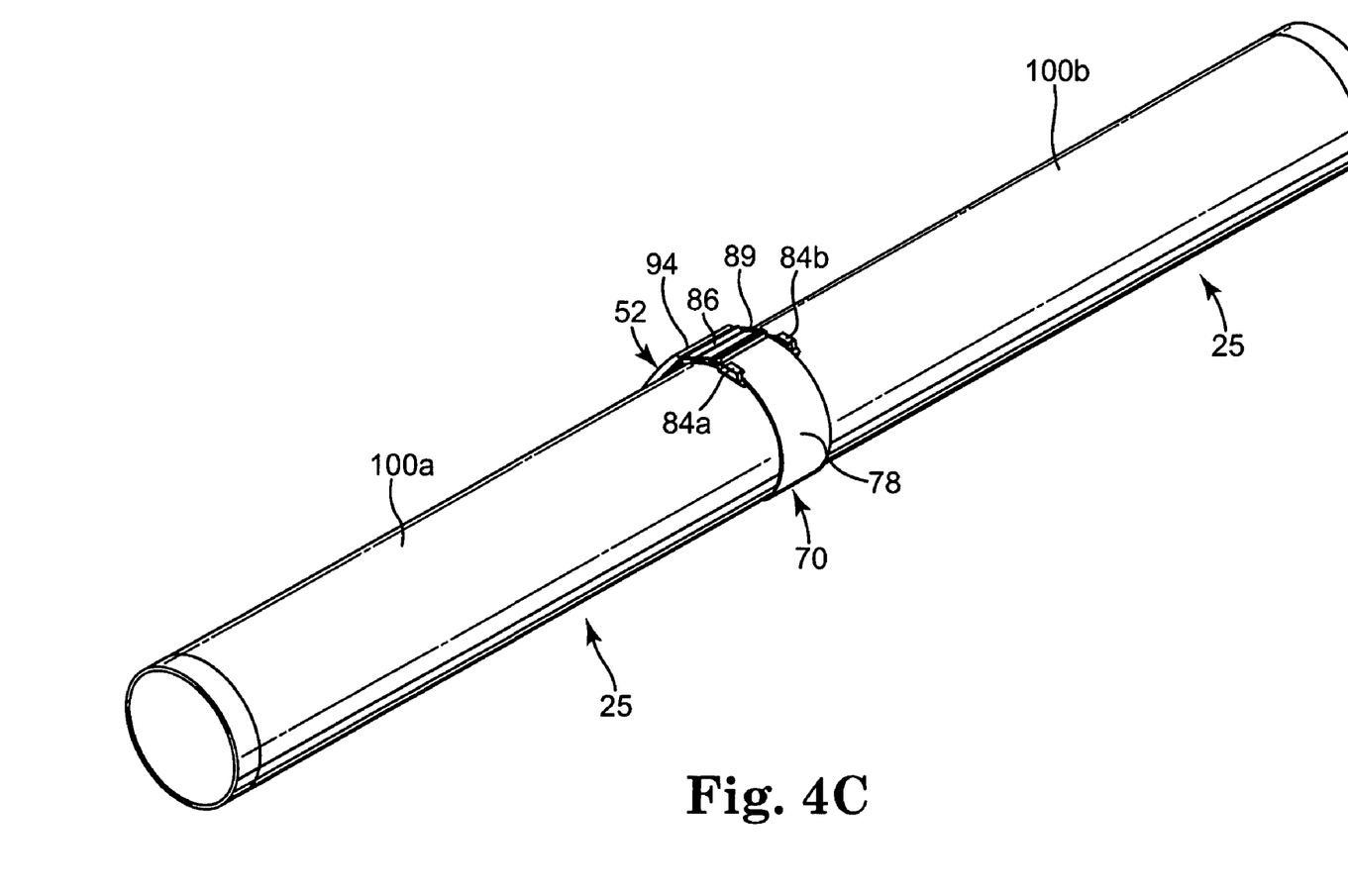
FIG. 4C is a perspective view of the ring clamp system shown in FIG. 2 tightly secured about the joint shown in FIG. 4A.

FIG. 4C illustrates the ductwork components 25 secured together by the ring clamp 52 and the seal 54. In this regard, and with additional reference to FIG. 4B, the engagement end 94 of the clasp 83 has been engaged with the first boss 86 and the clasp 83 has been moved to the down, or locked, position such that the ring clamp 52 is tightly compressed about the seal 54 (not shown). When in the locked position, the ring clamp 52 should not rotate relative to the seal 54. If the air handling system installer desires the ring clamp 52 to clamp more tightly about the ductwork components 25, the clasp 83 can be moved to the unlocked position (FIG. 4B) and the wire 89 moved to the second slot 98, whereupon movement of the clasp 83 back down to the locked position will more tightly cinch the ring clamp 52 about the ductwork components 25.

Figure 5:
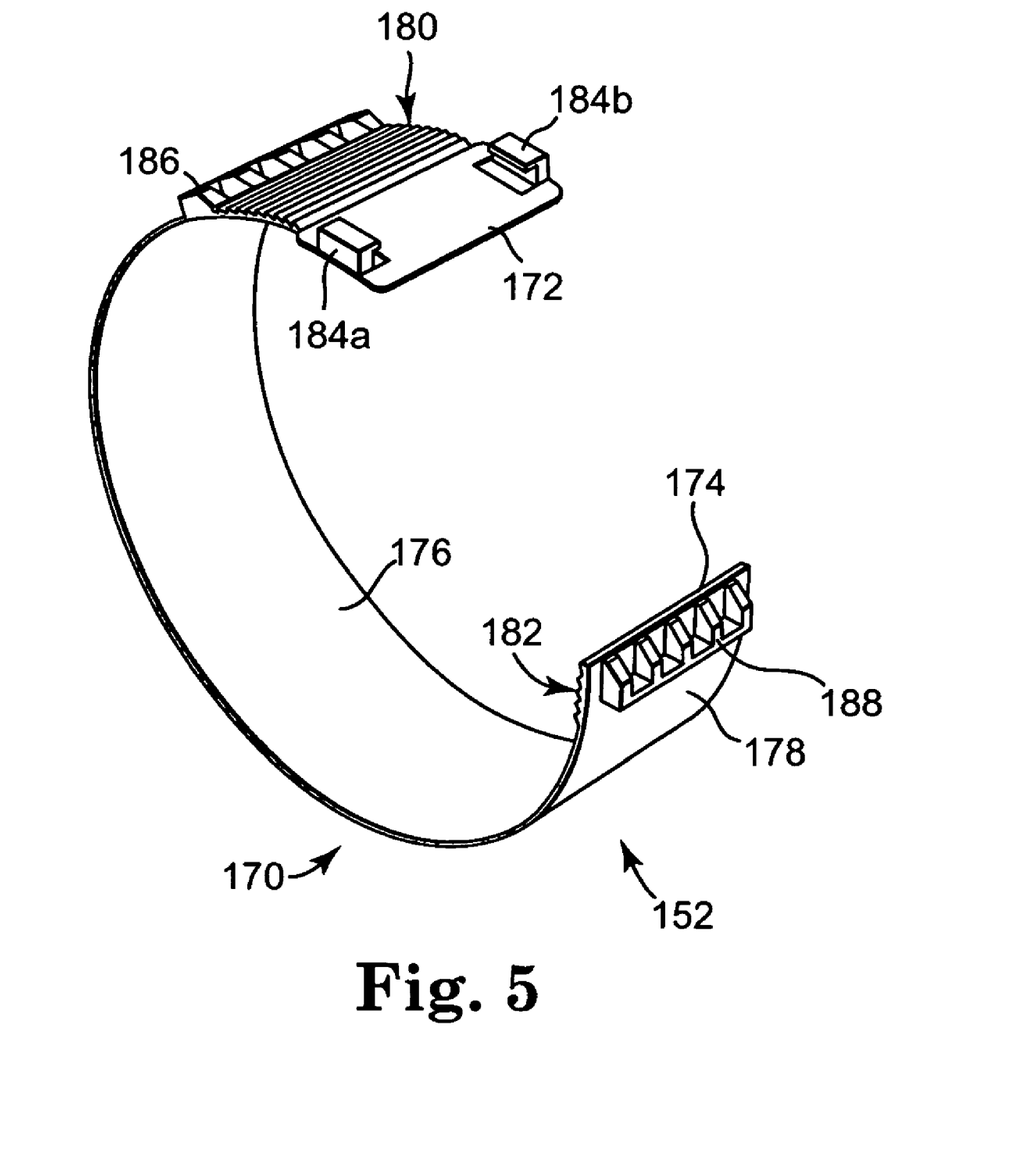
FIG. 5 is a perspective view of an alternate ring clamp according to one embodiment of the present invention.

FIG. 5 is a perspective view of an alternate ring clamp 152 according to one embodiment of the present invention. The ring clamp 152 includes a band 170 defining a receptor end 172, a tab end 174, an interior surface 176, an exterior surface 178, a first mating field 180, a second mating field 182, opposing guides 184a and 184b, and a first boss 186 and a second boss 188.

The band 170 is discontinuous such that the receptor end 172 is separate from the tab end 174. In addition, the band 170 is pre-stressed to approximate a ring shape such that the receptor end 172 is opposite from, and configured to receive, the tab end 174.

The first mating field 180 is formed on the exterior surface 178 adjacent to the receptor end 172, and the second mating field 182 is formed on a portion of the interior surface 176 at the tab end 174. The mating fields 180, 182 are configured to couple together to repositionably engage the receptor end 172 with the tab end 174. In one embodiment, the mating fields 180, 182 define an ordered pattern of projections adapted to removably interlock the ring clamp 152 about the ductwork components 25 (FIG. 1).

The opposing guides 184a, 184b are formed on the exterior surface 178 adjacent to the receptor end 172 and are configured to slidingly receive the tab end 174. In this regard, the guides 184a, 184b form a channel adapted to receive the tab end 174, such that the tab end 174 can enter the guides 184a, 184b and be aligned over the receptor end 172. In this manner, the tab end 174 is maintained between the guides 184a, 184b such that the mating fields 180, 182 are aligned one over the other to reproducibly interlock the band 170 in the ring shape.

The first boss 186 is formed adjacent to the first mating field 180, and the second boss 188 is formed at the tab end 174. In addition, the bosses 186, 188 are formed on the exterior surface 178. In this manner, the bosses 186, 188 occupy respective ends of the band 170 such that when the tab end 174 is coupled with the receptor end 172, the bosses 186, 188 can be employed to draw the band 170 tightly together, as described below.

Figure 6:
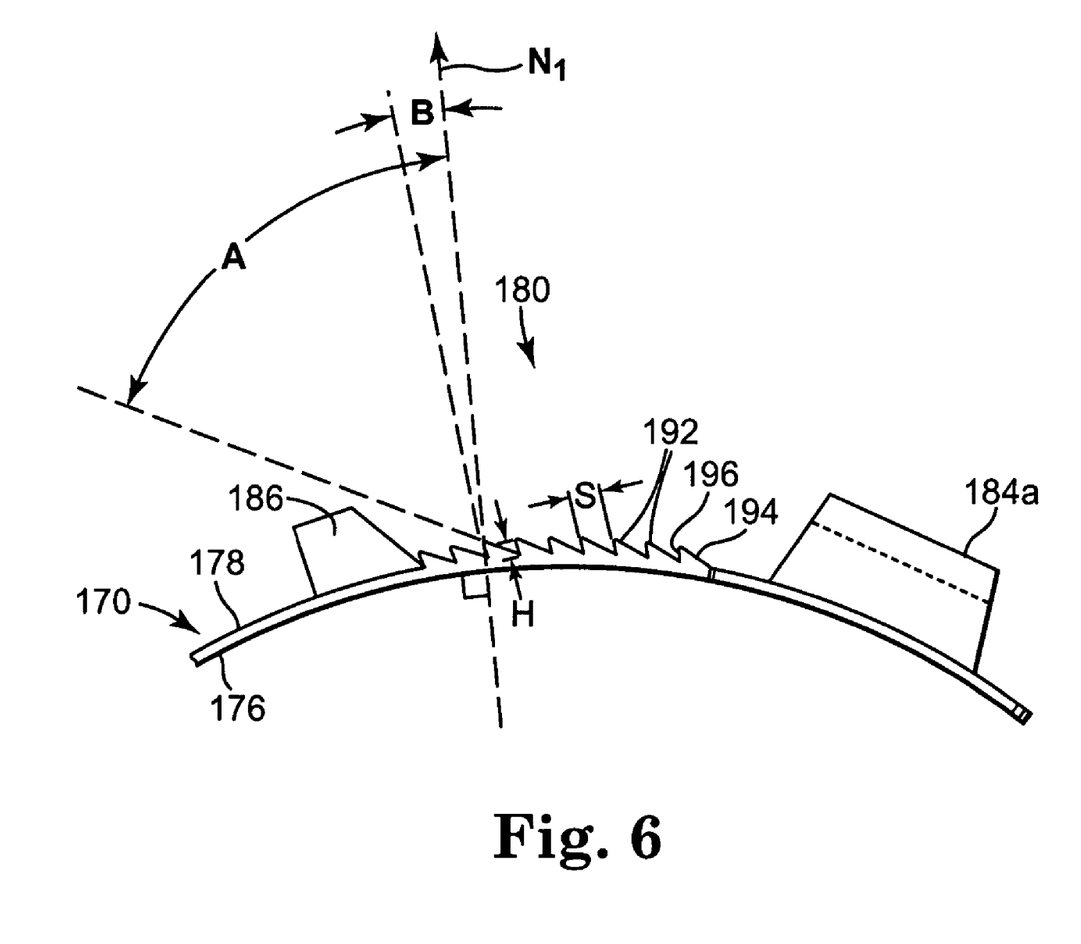
FIG. 6 is a side view of the ring clamp shown in FIG. 5 illustrating saw toothed-shaped teeth on a first mating field.

FIG. 6 is a side view of the first mating field 180 shown in FIG. 5. The first mating field 180 comprises a plurality of projections 192 extending from the exterior surface 178 of the band 170. In one embodiment, the first mating field 180 defines an ordered pattern of teeth 192 (or projections) that are complimentary to and suited for interlocking with the second mating field 182. In this regard, each of the projections 192 defines a height H and is spaced a distance S apart from others of the projections 192. For example, in one embodiment, the ordered pattern of projections 192 is circumferentially spaced 15 teeth-per-inch. In this regard, the spacing S is approximately 0.07 inches, although other spacings are acceptable. In a preferred embodiment, the spacing S is in the range of 0.04-0.2 inch; more preferably the spacing S is in the range of 0.05-0.1 inch.

The height H relates to a penetration depth achieved by the intermeshing mating fields 180, 182. In this regard, it is desired that the height H be of a sufficient dimension to accomplish a mutual interlocking between the mating fields 180, 182. In one embodiment, the height H of the projections 192 is in the range of 0.02-0.2 inch; more preferably the height H is approximately 0.04 inch.

In one embodiment, the projections 192 define a saw-tooth pattern. In this regard, the projections 192 each define a leading face 194 and a trailing face 196. To clarify the relationship between the leading face 194 and the trailing face 196, a line $N_1$ normal to the interior surface 176 of the band 170 is schematically depicted. In this manner, an extension of the leading face 194 of the tooth 192 defines a guide angle A. An extension of the trailing face 196 defines a rake angle B. The rake angle B represents an "undercut" such that the projection 192 is configured to grasp, or engage, with other complimentary projections 192. The guide angle A and the rake angle B are preferably less than 180 degrees with respect to the normal line $N_1$. In one embodiment, the guide angle A is in the range of 30 degrees-90 degrees, more preferably the guide angle A is in the range of 45 degrees-80 degrees. In one embodiment, the rake angle B is in the range of 0 degrees-30 degrees, more preferably, the rake angle B is in the range of 0 degree-15 degrees.

In a complimentary manner, the second mating field 182 (FIG. 2) likewise defines a plurality of projections that are substantially similar to the projections 192 of the first mating field 180, thus enabling the second mating field 182 to interlock with the first mating field 180. Specifically, the second mating field 182 includes projections having a spacing and a height equal to the spacing S, and the height H, of the projections 192. In addition, the projections on the second mating field 182 are preferably raked at an angle equal to the angle B, but oriented to rake in an opposing direction to the projections 192 of the first mating field 180.

With this in mind, in one embodiment the saw-tooth pattern of projections 192 is continuous for the full width across the band 170. That is to say, in one embodiment, the projections 192 define an ordered saw-tooth pattern in cross-section that is continuous across the width of the band 170. In an alternate embodiment, the first mating field 180 and the second mating field 182 can define a complimentary ordered pattern of projections and recesses. For example, the first mating field 180 can define an ordered pattern of projections (for example, pins or posts) and the second mating field 182 can define an ordered pattern of recesses (for example, holes or cups) such that the projections of the first mating field 180 couple into the recesses of the second mating field 182. In any regard, the second mating field 182 is configured to removably interlock (i.e., mesh) with the first mating field 180.

Figure 7:
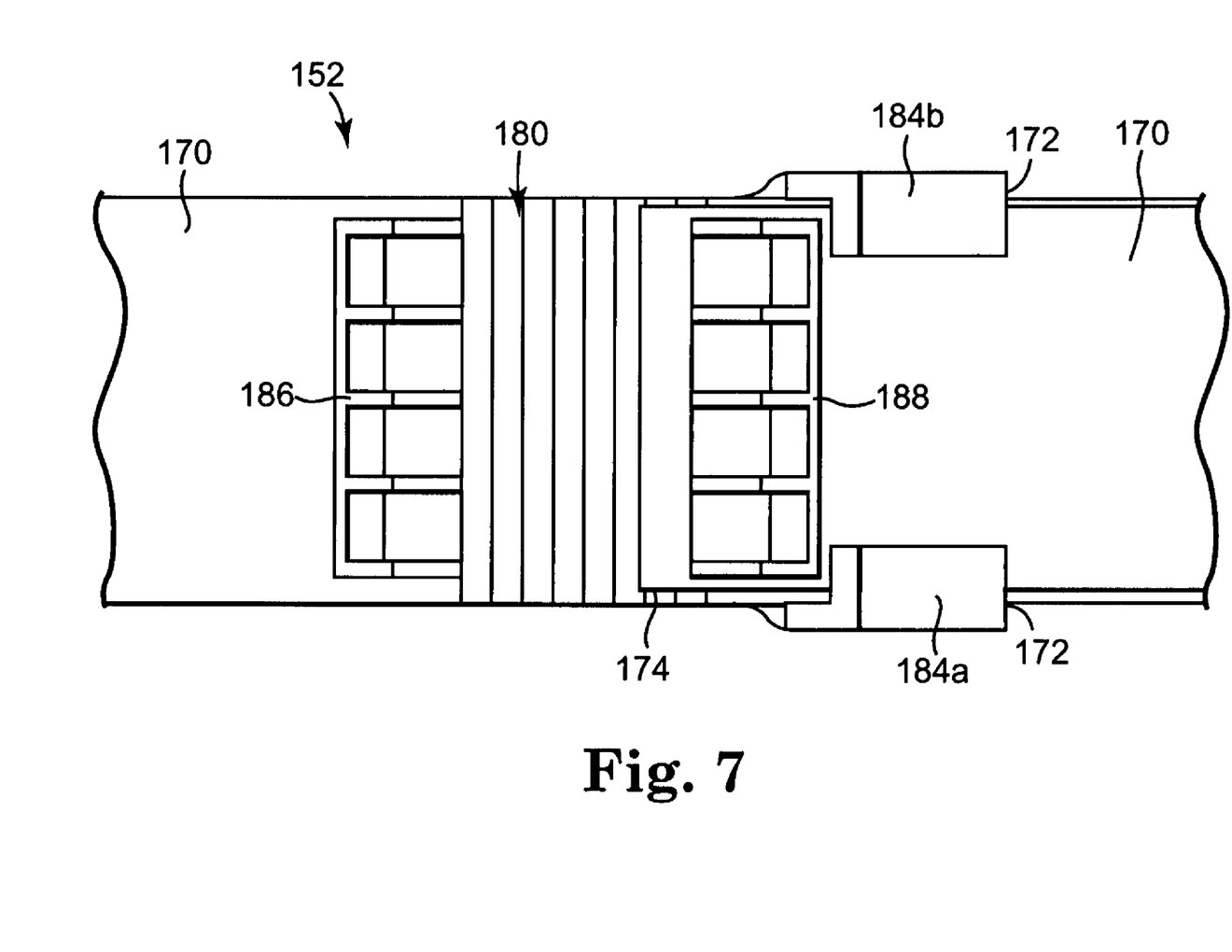
FIG. 7 is a top view of the ring clamp shown in FIG. 5 having a tab end positioned between opposing guides according to one embodiment of the present invention.

FIG. 7 is a top view of the ring clamp 152 having the tab end 174 introduced between the opposing guides 184a, 184b. The opposing guides 184a, 184b are formed as part of the receptor end 172 and are dimensioned to slidingly receive the tab end 174. In addition, the bosses 186, 188 are integrally formed with the band 170. To this end, the bosses 186, 188 are centrally located within a width of the band 170 and have a width selected to permit the second boss 188 to pass between the opposing guides 184a, 184b. In one embodiment, the second boss 188 has a width of approximately 3.25 inches, although other configurations and dimensions permitting the second boss 188 to pass between the guides 184a, 184b are equally acceptable.

Figure 8:
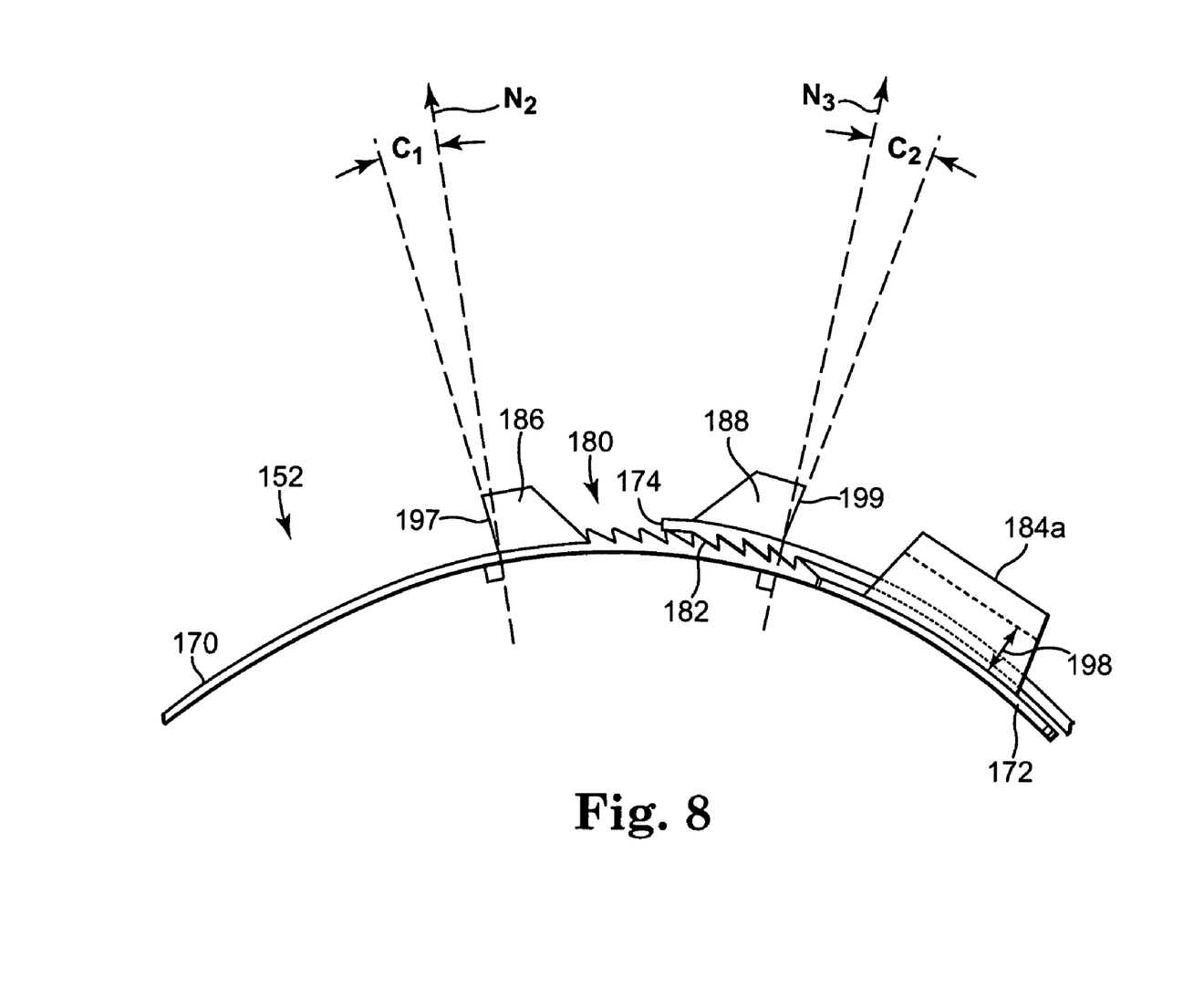
FIG. 8 is a side view of the ring clamp shown in FIG. 7 illustrating a second mating field interlocked with the first mating field.

FIG. 8 is a side view of the ring clamp 152 shown in FIG. 7. The tab end 174 has been threaded between a channel 198 of the guide 184b. Each of the opposing guides 184b (184a not shown) are configured such that the channel 198 will slidingly receive the tab end 174. The opposing guide 184b is preferably C-shaped such that the channel 198 has a height of approximately 0.25 inch (it being understood that guide 184a is substantially similar to guide 184b). In this manner, the opposing guides 184a, 184b are configured to slidingly receive and minimize lateral movement of the tab end 174.

In one embodiment, the first boss 186 defines a height of approximately 0.3 inch and the second boss 188 defines a height of approximately 0.2 inch. In addition, each boss 186, 188 defines an engagement face 197, 199, respectively. The engagement faces 197, 199 are angled with respect to a vertical orientation. Specifically, vertical line $N_2$ is depicted orthogonal to the band 170 such that the engagement face 197 defines an engagement angle $C_1$ relative to the vertical line $N_2$. A vertical line $N_3$ that is normal to the band 170 in the location of the second boss 188 forms a vertical reference line with regard to the engagement face 199. In this way, the second boss 188 defines an engagement face 199 that forms an engagement angle $C_2$ with respect to the vertical line $N_3$. In one embodiment, the engagement angle $C_1$ is equal to the engagement angle $C_2$. The engagement angles $C_1$, $C_2$ are preferably between zero and 45 degrees, more preferably the engagement angles $C_1$, $C_2$ are between 10 degrees and 30 degrees. In this manner, the first and second bosses 186, 188 provide engagement faces 197, 199, respectively, that are suited for grasping by a tool, as more fully described below.

Figure 9:
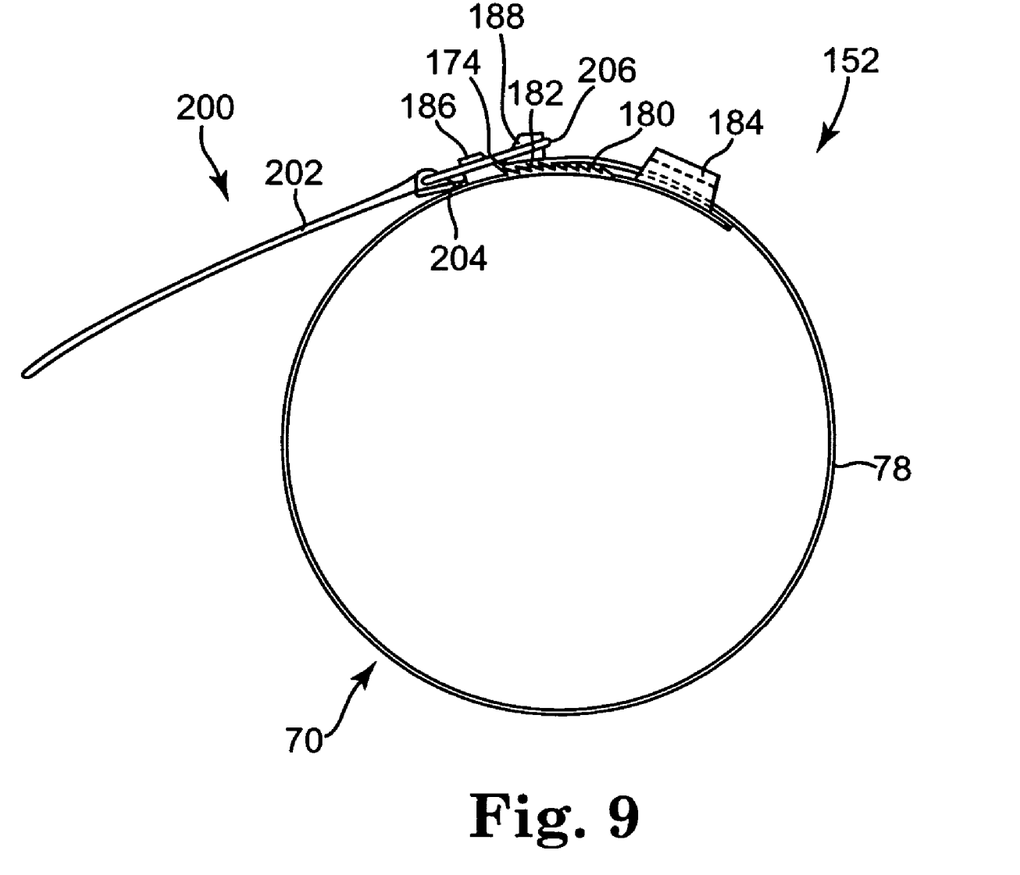
FIG. 9 is a side view of the ring clamp shown in FIG. 8 illustrating a clamp tool employed to cinch the ring clamp together.

In one embodiment, a clamp tool 200 is employed to cinch the ring clamp 152 tightly together as illustrated in FIG. 9. The clamp tool 200 includes a handle 202 terminating in a head 204 and a wire frame 206 extending from the head 204. The wire frame 206 is configured to couple with one of the bosses 186, 188. The head 204 is configured to couple with the other of the bosses 186, 188 such that the head 204, in combination with the wire frame 206, cinches the bosses 186, 188 into closer proximity with each other. In a ratcheting manner, the clamp tool 200 can be employed to draw the bosses 186, 188 tightly together in securing adjacent ductwork components 25 (FIG. 1).

The ring clamps 52 (FIG. 2) and 152 (FIG. 5) have been described and are particularly useful in the convenient and cost effective assembly of the HVAC ductwork components 25 (FIG. 1). Through the sequential assembly of the appropriate ductwork components 25, unique residential, commercial, and industrial HVAC air handling systems 20 (FIG. 1) can be constructed. With this in mind, a kit of parts providing various clamping components is useful.

Figure 10A:
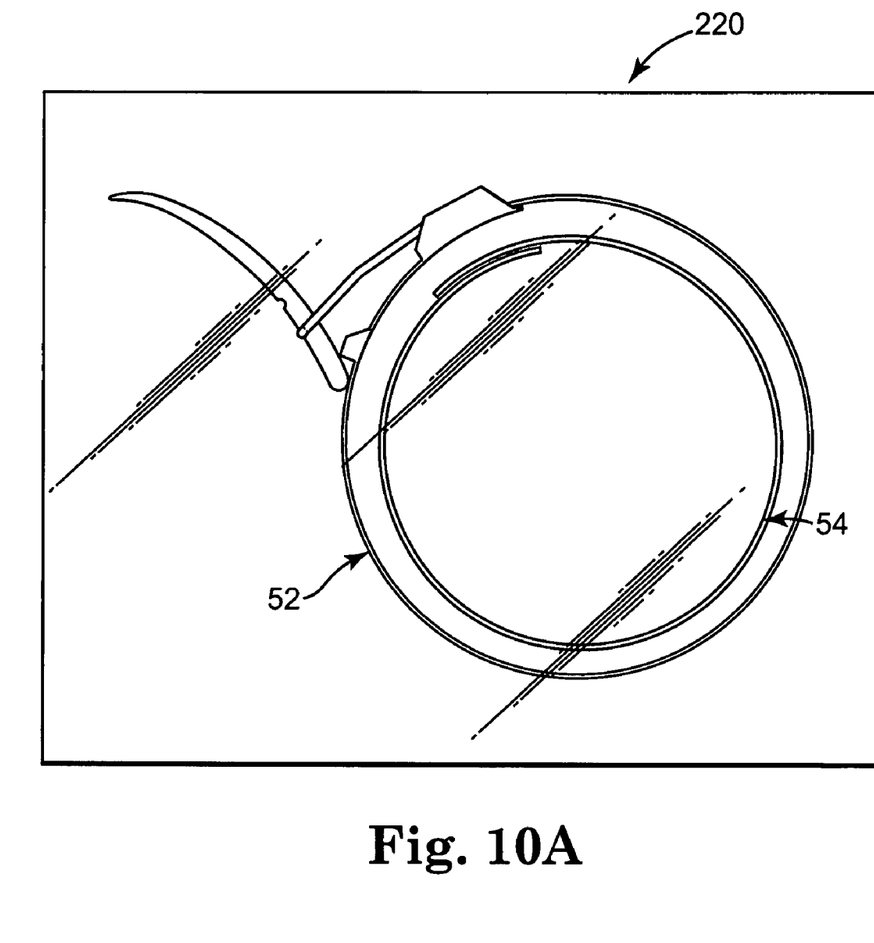
FIG. 10A is top view of a kit of parts including a ring clamp having an integral clasp, and a seal according to one embodiment of the present invention.
Figure 10B:
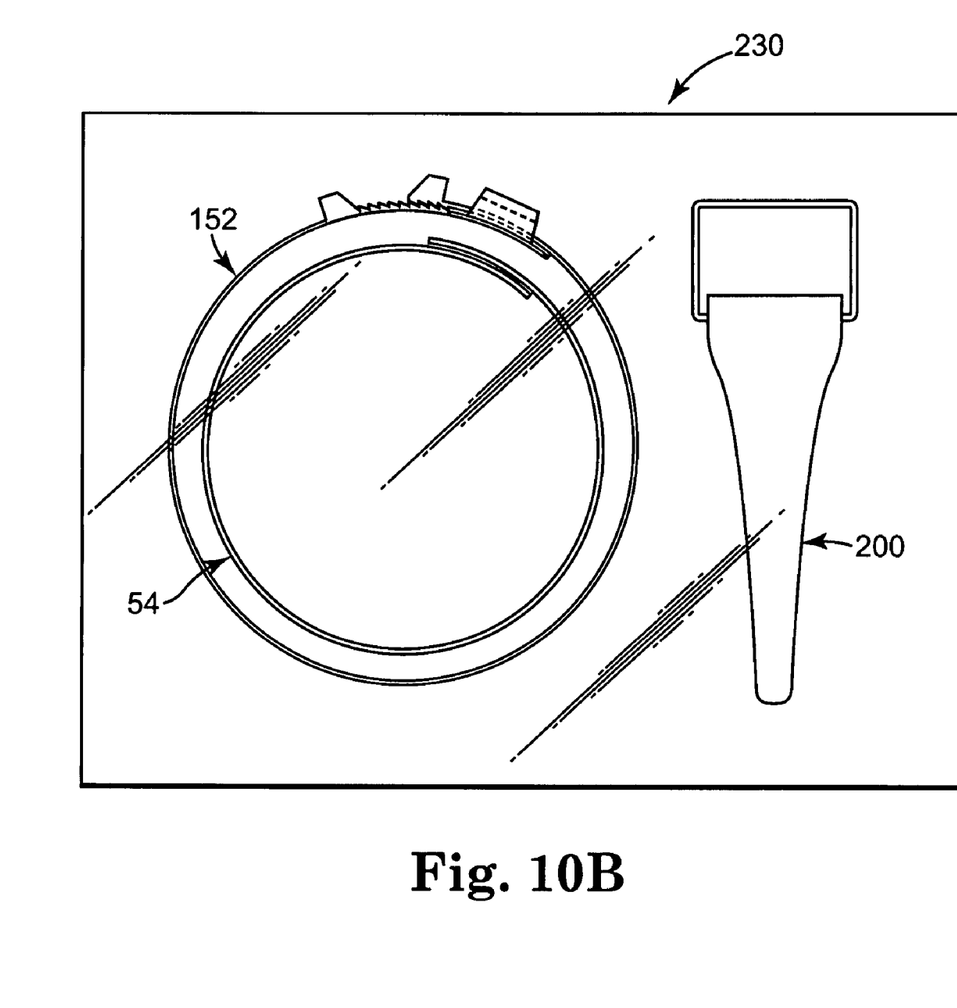
FIG. 10B is top view of an alternate kit of parts including a ring clamp, a clamp tool, and a seal according to one embodiment of the present invention.

FIG. 10A illustrates a kit 220 of parts according to one embodiment of the present invention. The kit 220 includes the clamp 52 having the integral clasp 83, and the seal 54 described above with reference to FIG. 2. An alternate kit 230 of parts according to one embodiment of the present invention is shown in FIG. 10B. The kit 230 includes the ring clamp 152, the seal 54, and the clamping tool 200. While not shown, the kits 220, 230 can include various ductwork components 25 and/or multiple clamps 52, 152, multiple seals 54, and additional clamping tools 200.

Although specific embodiments have been illustrated and described herein, it will be appreciated by those of ordinary skill in the art that a variety of alternate and/or equivalent implementations can be substituted for the specific embodiments shown and described without departing from the scope of the present invention. This application is intended to cover any adaptations or variations of the above described ring clamps employed in assembling HVAC components of air handling systems. Therefore, it is intended that this invention be limited only by the claims and the equivalents thereof.

What is claimed is:

1. An air handling system comprising:
   a first ductwork component;
   a second ductwork component coupled to the first ductwork component to define a joint; and
   a ring clamp secured about the joint, the ring clamp including:
      a band provided apart from the ductwork components and extending continuously between a receptor end, and a tab end, the band defining an interior surface and an exterior surface,
      at least one projection formed on the exterior surface adjacent the receptor end,
      at least one projection formed on the interior surface at the tab end,
      wherein the receptor end defines opposing guides configured to slidingly receive the tab end, and
      wherein the tab end defines a transverse width, and further wherein each of the opposing guides includes a side wall extending from the exterior surface and a top wall extending from the side wall, and further wherein a distance between the side walls is greater than the transverse width;
   wherein the projections interlock to maintain a position of the ring clamp about the joint.

2. The air handling system of claim 1, wherein the at least one projection formed on the exterior surface is a first mating field of ordered projections and the at least one projection formed on the interior surface is a second mating field of ordered projections.

3. The air handling system of claim 2, wherein the ordered projections on at least one of the first and second mating fields are circumferentially formed at between 5 to 25 projections per lineal inch.

4. The air handling system of claim 1, wherein the ordered projections on at least one of the first and second mating fields are continuous in a lateral direction.

5. The air handling system of claim 1, wherein the ordered projections on at least one of the first and second mating fields defines saw-teeth.

6. The air handling system of claim 5, wherein the saw-teeth are raked at an angle between 5 degrees to 60 degrees with respect to a plane centered between the interior surface and the exterior surface of the band.

7. The air handling system of claim 1, wherein the tab end defines a transverse width, and further wherein each of the opposing guides includes a side wall extending from the exterior surface and a top wall extending from the side wall, and further wherein a distance between the side walls is greater than the transverse width.

8. The air handling system of claim 1, wherein the receptor end terminates at a leading edge and includes a plurality of teeth consecutively arranged relative to a longitudinal extension of the receptor end, the plurality of teeth terminating at a leading tooth closest the leading edge, and further wherein the opposing guides are longitudinally between the leading edge and the leading tooth.

9. The air handling system of claim 8, wherein an entirety of each of the opposing guides are longitudinally between the leading edge and the leading tooth.

* * * * *